United States Patent [19]

Naganawa et al.

[11] Patent Number: 5,302,335
[45] Date of Patent: Apr. 12, 1994

[54] METHOD FOR THE PREPARATION OF WATER-REPELLANT HARDENED MOLDINGS

[75] Inventors: Tsutomu Naganawa; Isao Ona, both of Chiba, Japan

[73] Assignee: Dow Corning Toray Silicone Co., Ltd., Tokyo, Japan

[21] Appl. No.: 33,733

[22] Filed: Mar. 18, 1993

[30] Foreign Application Priority Data

Mar. 24, 1992 [JP] Japan ................... 4-096978

[51] Int. Cl.$^5$ .................... B28B 1/26; B28B 3/00
[52] U.S. Cl. ................................ 264/333; 264/86
[58] Field of Search ..................... 264/333, 86, 87

[56] References Cited

U.S. PATENT DOCUMENTS

| | | | |
|---|---|---|---|
| 3,887,669 | 6/1975 | Pillet | 564/256 X |
| 3,901,991 | 8/1975 | Ueda et al. | 264/333 X |
| 4,002,713 | 1/1977 | Duncan et al. | 264/333 X |
| 4,193,958 | 3/1980 | Uchida et al. | 264/333 X |
| 4,388,257 | 6/1983 | Oguri et al. | 264/333 X |
| 4,394,335 | 7/1983 | Roth et al. | 264/333 X |
| 4,427,611 | 1/1984 | Oguri et al. | 264/333 X |
| 4,498,929 | 2/1985 | Robertson | 264/338 X |
| 4,534,928 | 8/1985 | Martin | 264/338 X |
| 4,741,773 | 5/1988 | Kuroda et al. | 106/901 X |
| 4,775,505 | 10/1988 | Kuroda et al. | 264/82 |

FOREIGN PATENT DOCUMENTS

| | | | |
|---|---|---|---|
| 50187 | 5/1981 | Japan | 264/333 |
| 92963 | of 1984 | Japan | . |
| 1086473 | 5/1986 | Japan | 264/333 |
| 35790 | of 1989 | Japan | . |
| 58148 | of 1989 | Japan | . |
| 15511 | of 1990 | Japan | . |
| 58227 | of 1990 | Japan | . |

*Primary Examiner*—Karen Aftergut
*Attorney, Agent, or Firm*—Sharon K. Severance

[57] ABSTRACT

A method for the fabrication of water-repellent hardened moldings wherein the diorganopolysiloxane is not discharged into the effluent water during the molding or forming process and the molding itself is free of nonuniformities in its water repellency. The method for the preparation of water-repellent hardened moldings includes forming a slurry of a mixture including a calcareous raw material and a siliceous raw material in an arbitrary quantity of water; emulsifying a diorganopolysiloxane using nonionic surfactant and adding this emulsion to the slurry at a temperature at or above the cloud point of the nonionic surfactant; subsequentially draining off the water, then molding or forming, and finally drying or steam-curing to produce the water-repellent hardened molding.

13 Claims, No Drawings

METHOD FOR THE PREPARATION OF WATER-REPELLANT HARDENED MOLDINGS

BACKGROUND OF THE INVENTION

Calcium silicate moldings and the recently popularized cement exterior wall materials have become essential building materials in the last few years, and are used as various types of insulating materials and as exterior wall panels for prefabricated housing and the like.

These calcium silicate moldings are prepared by dispersing lime and silicic acid in a large quantity of water and heating the resulting slurry. A crystalline structure (tobermorite, gyrolite, wollastonite, etc.) is formed that consists of a crystalline structure of calcium oxide, silicon dioxide, and water. Moldings are generally used that have been asbestos, etc.) in the slurry, pouring the slurry into a form, draining, molding, and drying or optionally steam-curing. The various types of exterior wall panels used for example, in prefabricated housing, consist of the strong, hard moldings prepared by dispersing cement, crushed silica, perlite, and asbestos to homogeneity in a large volume of water, pouring this into a form, draining, molding, and then steam-curing and drying.

At specific gravities of 0.2 to 0.5, these calcium silicate moldings have very good thermal insulating characteristics due to their high air contents. The so-called exterior wall panels typically have specific gravities within the range of 0.8 to 1.2. However, a common problem among these calcium silicate moldings has been their high water absorptiveness. For example, a calcium silicate molding immersed in water overnight will absorb about 80 to 95 weight % water. Water absorption rates of approximately 30 to 40 weight % occur even with exterior wall panels. The freezing of this absorbed water causes cracking and surface attrition, which of course is a prohibitive drawback to the application of such panels in cold-weather regions. Another problem with these materials is that their absorption of large quantities of water impairs their thermal insulating performance.

In response to these problems, there have been numerous attempts at equipping calcium silicate moldings with a native water repellency through the addition thereto of diorganopolysiloxane or a diorganopolysiloxane emulsion prepared using anionic surfactant. For example Japanese Patent Application Laid Open [Kokai] Number Sho 59-92963 [92.963/1984], Japanese Patent Publication [Kokoku] Number Hei 2-58227 [58.227/1990]. Japanese Patent Publication Number Hei 2-15511 [15.511/1990]. Japanese Patent Publication Number Hei 1-58148 [58.148/1989]. and Japanese Patent Publication Number Hei 1-35790 [35.790/1989] propose such methods.

However, these known methods suffer from several problems. When a diorganopolysiloxane is added to a large volume of water-based slurry, this diorganopolysiloxane, being insoluble in water, does not become uniformly dispersed in the slurry. This results in an uneven manifestation of the water repellency. On the other, absorption by the diorganopolysiloxane is unsatisfactory in the case of the addition of an anionic surfactant-based diorganopolysiloxane emulsion. This results in the release of diorganopolysiloxane into the waste water, which creates problems for water purification.

The present invention pertains to a method for the preparation of water-repellent hardened moldings by using an emulsion that is readily broken in the type of slurry under consideration. The emulsion may be readily broken in the type of slurry under consideration when a diorganopolysiloxane with a specific structure is emulsified using nonionic surfactant that has a cloud point and this emulsion is then mixed into the slurry at a temperature at or above this cloud point. This results in almost no release of diorganopolysiloxane into the effluent during the sheet fabrication process.

The present invention takes as its object the introduction of an efficient method for the fabrication of uniformly water-repellent hardened moldings that does not release diorganopolysiloxane into the effluent during the molding process and that provides moldings in which there is no variation in water repellency.

THE INVENTION

The present invention relates to a method for the fabrication of water-repellent hardened moldings. More specifically, the present invention relates to a method for the fabrication of water-repellent hardened moldings whose principal starting materials are calcareous and siliceous raw materials.

The present invention relates to a method for the preparation of water-repellent hardened moldings, wherein the method comprises (I) slurrying a mixture (A) comprised of a calcareous raw material that has CaO unit as its main component and siliceous raw material that has $SiO_2$ unit as its main component, in an arbitrary quantity of water:

(II) adding to this slurry an emulsion (B) comprising 0.05 to 10 weight parts of a diorganopolysiloxane represented by the following formula

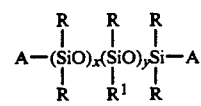

and a nonionic surfactant that has a cloud point: wherein said addition is carried out with mixing and at a temperature at or above the cloud point of the nonionic surfactant; and wherein R is a monovalent hydrocarbon group: $R^1$ is an alkyl group having 4 to 12 carbon atoms: x is a number with a value of zero to 1.000: y is a number with a value of zero to 500: $x+y$ has a value of 2 to 1.000; and A is selected from the group consisting of R and $R^1$; with the proviso that, when $y=zero$, A is selected from the group consisting of R. $OR^2$, $R^1$, and the hydroxyl group where $R^2$ is an alkyl group having 1 to 3 carbons; and (III) subsequently draining off the water, then molding or forming, and finally drying or steam-curing.

To explain the preceding in greater detail, component (A), of the present invention is comprised of a mixture of a calcareous starting material and siliceous raw material. The calcareous starting material, need only contain the CaO unit as its principal or main component. The calcareous starting material may be exemplified by, but not limited to, quick lime, limestone, slaked lime, cement, calcium silicate, and calcium carbonate, in each case ground into a microfine powder. The siliceous raw material need only contain the $SiO_2$ unit as its principal or main component. The siliceous raw material may be exemplified by, but not limited to, silica, sand, quartzite, clay, perlite, diatomaceous earth, crushed rock (such as feldspar powder or quartz powder). and glass powder. The compounding ratio between the calcareous and siliceous components varies substantially from application to application and for this reason cannot be specifically restricted.

The calcareous and siliceous materials must be preliminarily slurried using an arbitrary quantity of water. As desired, a crystalline structure of CaO, SiO$_2$ and H$_2$O can be preliminarily synthesized using, for example, an autoclave. As a general rule, this arbitrary quantity of water suitably comprises 5 to 30 times the quantity of calcareous plus siliceous raw materials.

Component (B) of the present invention is an emulsion comprising a diorganopolysiloxane and a nonionic surfactant that has a cloud point. The diorganopolysiloxane is selected from diorganopolysiloxanes having the following formula:

In this formula R is a monovalent hydrocarbon group. R may be exemplified by, but not limited to alkyl groups such as methyl, ethyl, propyl, octyl, nonyl, tridecyl, and tetradecyl; aralkyl groups such as 2-phenylethyl and 2-phenylpropyl; haloalkyl groups such as 3,3,3-trifluoropropyl; cycloalkyl groups such as cyclohexyl; aryl groups such as phenyl and naphthyl; and alkaryl groups such as tolyl and xenyl. R$^1$ is an alkyl group having 4 to 12 carbons. R$^1$ may be exemplified by alkyl groups in the range from butyl to dodecyl including isomers. The subscript c is a number from 0 to 1.000, y is a number from 0 to 500, and x+y is a number in the range of 2 to 1,000. With regard to A, the molecule may be endblocked by R or R$^1$, the hydroxyl group, or an alkoxy group having 1 to 3 carbon atoms.

When y is 0, this component becomes polysiloxane with the following general formula

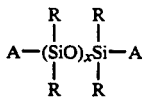

wherein R and A are defined as above and x has a value of at least 2. A polydimethylsiloxane is the typical example of this particular species.

In general, the presence of the y unit in component (B) yields additional improvements in the water repellency and photoresistance. As a consequence, when such properties are particularly critical, y preferably has a value of 1 to 500. In addition, diorganopolysiloxane is also effective in which x=0, that is, a diorganopolysiloxane that consists of only the y unit. When the diorganopolysiloxane consists of only the y unit. R$^1$ is preferably a C$_4$ or C$_5$ alkyl, such as butyl or pentyl, and y preferably has a value of 3 to 100.

The diorganopolysiloxane may be exemplified by the following compounds:

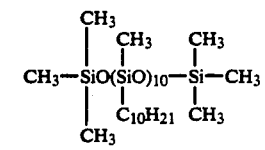

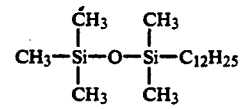

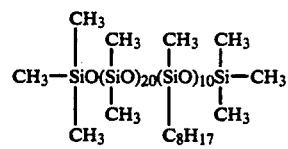

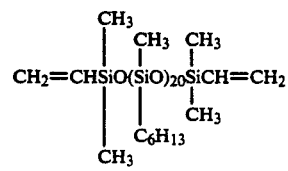

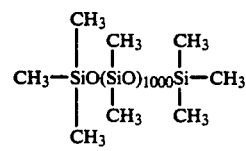

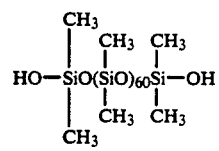

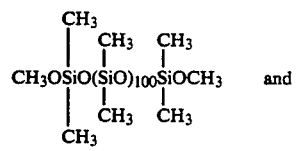 and

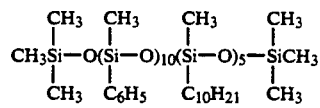

The diorganopolysiloxane may consist of a single species, but the use of several species in combination is also effective.

The diorganopolysiloxane is used at 0.05 to 10 weight parts per 100 weight parts component (A). The diorganopolysiloxane should be added at 5 to 10 weight parts to produce completely water-repellent moldings at low specific gravities of 0.2 to 0.4. The addition of 0.1 to 2 weight parts will be satisfactory for moldings with high specific gravities at 0.8 to 1.2. The quantity of addition generally falls within the range of 0.5 to 5 weight parts.

In accordance with the preparative method of the present invention, an emulsion is prepared of the diorganopolysiloxane by emulsifying the diorganopolysiloxane with a nonionic surfactant that has a cloud point. Nonionic surfactants useful in the present invention may be exemplified by, but not limited to, ethylene oxide adducts of higher alcohols, ethylene oxide adducts of alkylphenols, ethylene oxide adducts of fatty acids, ethylene oxide adducts of fatty acid esters with polyhydric alcohols such as glycerol and sorbitol, ethylene oxide adducts of oils and fats, and ethylene oxide adducts of higher alkylamines. Preferred among the preceding nonionic surfactants are the ethylene oxide adducts of higher alcohols and the ethylene oxide adducts of alkylphenols.

In the case of the ethylene oxide adducts of higher alcohols, emulsification is accomplished through the use of a combination of 2 or 3 species of the ethylene oxide adduct of higher alcohols that have different numbers of moles of ethylene oxide and HLB values in the range of 5 to 20. These nonionic surfactants have cloud points. They become homogeneously dissolved and dispersed in water at temperatures below the cloud point. However, a white turbidity suddenly appears at the cloud point, and the nonionic surfactant, which up to that point will have been homogeneously dissolved and dispersed, becomes insoluble and precipitates and the micelles in the diorganopolysiloxane emulsion are broken as a result.

The cloud points of some ethylene oxide adducts higher alcohols are exemplified as follows: cloud point of 40° C. for the 7.5 mole ethylene oxide (EO) adduct of nonylphenol, cloud point of 70° C. for the 11 mole EO adduct of nonylphenol, cloud point of 40° C. for the 6.5 mole EO adduct of lauryl alcohol, cloud point of 60° C. for the 7.5 mole EO adduct of lauryl alcohol, and cloud point of 80° C. for the 9.0 mole EO adduct of lauryl alcohol. There are no specific restrictions on the quantities of water and nonionic surfactant used in the emulsification of the diorganopolysiloxane. In general, small additions of nonionic surfactant are preferred in order to minimize the BOD and COD loads on waste water treatment in the sheet fabrication process. The nonionic surfactant is generally added at 1 to 5 weight parts per 100 weight parts of the diorganopolysiloxane. The diorganopolysiloxane is preferably emulsified as follows: 2 or 3 nonionic surfactants with different HLB values are added to the diorganopolysiloxane with stirring to homogeneity, water is added, and a homogeneous emulsion is then prepared using an emulsifying device such as a colloid mill, homomixer, sonolator, line mixer, homogenizer, or other means. The diorganopolysiloxane is thereby converted into a micelle that is enclosed by nonionic surfactant and becomes homogeneously dispersed in the water.

The manifestation of a cloud point is a characteristic feature of the nonionic surfactants operative herein. The use of anionic surfactant, the combination of anionic surfactant and nonionic surfactant, or the combination of cationic surfactant and nonionic surfactant should be avoided either because anionic surfactants do not have a cloud point or because the cloud point is extinguished. Emulsions prepared using a surfactant lacking a cloud point have an increased stability, which results in an increased release of diorganopolysiloxane into the waste water.

In the present invention, the emulsion (B) is mixed into the slurry (A). If at this point addition is carried out at a temperature below the cloud point of the nonionic surfactant, absorption of the diorganopolysiloxane will be inadequate and it will be released into the waste water from the sheet fabrication process. As a consequence, the fluid slurry must be preliminarily heated to at least the cloud point of the nonionic surfactant. For example, assuming the use of several species of nonionic surfactants in combination and assuming a cloud point of 35° C. for this mixture, the slurry temperature should then be at least 36° C. which is higher than this temperature, and would optimally be 45° to 50° C.

The cloud point of nonionic surfactant is readily accessible to measurement. Thus, a transparent 0.5 to 1.0 weight % aqueous solution of the surfactant is first prepared at low temperature and then gradually heated. As the temperature increases, dehydration occurs and the entire mass suddenly assumes a white turbidity at a particular temperature. At this point the surfactant converts to fine droplets and precipitates. This temperature is the cloud point. By carrying out the addition/mixing operation at or above the cloud point, the already formed emulsion is relatively easily broken and a uniform uptake occurs onto the surfaces of secondary particles, siliceous component and other components in the slurry. Release or discharge therefore does not occur in the subsequent draining process during sheet fabrication. After drainage, heating and drying at 150° to 200° C. or optionally curing in an autoclave at 180° to 200° C. affords the water-repellent hardened molding due to orientation of the molecules of the diorganopolysiloxane on the surfaces of the secondary particles, reinforcing asbestos and other slurry components.

In addition to the calcareous and siliceous raw material and diorganopolysiloxane components described hereinbefore, the following may also be present insofar as the object of the present invention is not impaired: water glass, asbestos, pulp, synthetic fibers, glass fibers, organosilanes, organosiloxanes, rust inhibitors, colorants, and others.

Due to the excellent water repellency exhibited by the water-repellent hardened moldings afforded by the preparative method of the present invention, this method is useful for the preparation of calcium silicate moldings, various types of cement exterior walls, slate, and others.

So that those skilled in the art can understand and appreciate the invention taught herein, the following examples are presented, being it understood that these examples should not be used to limit the scope of this invention found in the claims attached hereto.

In the examples, "parts" denotes weight parts and "%" denotes weight percent.

The following diorganopolysiloxanes and emulsifying agents were used in the examples, and the water absorption, water repellency, and so forth were evaluated by the methods also given below.

Diorganopolysiloxanes diorganopolysiloxane a (viscosity=22 cst): trimethylsiloxy-endblocked dimethylsiloxane-methyloctylsiloxane copolymer with the following formula

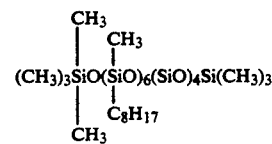

diorganopolysiloxane b (viscosity=70 cst): dimethylsilanol-endblocked dimethylpolysiloxane with the following formula

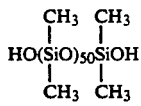

diorganopolysiloxane g (viscosity = 10.000 cst): trimethylsiloxy- endblocked dimethylpolysiloxane with the following formula

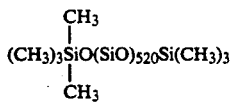

Surfactants

Nonionic surfactant a: polyoxyethylene (6.5 moles) lauryl ether, cloud point = 40° C.

Nonionic surfactant b: polyoxyethylene (8.0 moles) lauryl ether, cloud point = 60° C.

Nonionic surfactant c: polyoxyethylene (9.5 moles) nonylphenyl ether, cloud point = 58° C.

Anionic surfactant d: sodium dodecylbenzenesulfonate, no cloud point

-Evaluations

Water Absorption: The hardened molding was cut into a 5×5×3 cm panel, and this was immersed in water for 24 hours and then removed. The water absorption was measured from the difference between the weight before immersion and the weight after immersion.

$$\text{water absorption (\%)} = \frac{\text{weight (g) after immersion} - \text{weight (g) before immersion}}{\text{weight (g) before immersion}} \times 100$$

Water Repellency: An approximately 0.03 g water droplet was dripped on each of 3 sites on the surface of the molding. The water repellency was visually evaluated using the following 5 level scale:

+ + + the spherical shape of the water droplet is maintained even after 30 minutes, and the water repellency is therefore very good + + the water droplet has become hemispherical after 20 minutes, but the water repellency is still very good + the water droplet has collapsed after 10 minutes but has not been absorbed, and the water repellency is therefore moderately good × the water droplet is absorbed and spread out after 2 to 3 minutes, and the water repellency is therefore poor × × the water droplet is immediately absorbed and spread out, and the water repellency is therefore very poor Analysis of the Diorganopolysiloxane in the Filtrate (Waste Water): 100 cc toluene was added to 1 L of the filtrate, and this was thoroughly shaken in a separatory funnel. The toluene extract was recovered after quiescence. This extract was diluted with methyl isobutyl ketone, and the diluted solution was analyzed using an ICP emission spectrochemical analyzer (sequential type) from Seiko Denshi Kogyo Kabushiki Kaisha.

EXAMPLE 1

47 parts crushed silica, 45 parts calcium oxide powder, and 8 parts portland cement were dispersed in 2.000 parts water with stirring to homogeneity, and this was then thermally processed for 10 hours in an autoclave at 180° C. The dispersion was subsequently removed from the autoclave and cooled to room temperature by standing. To this dispersion was added a water based dispersion that had been preliminarily prepared by the dispersion of 5 parts asbestos in 500 parts water at 50° C. Stirring to homogeneity and maintenance at 50° C. afforded slurry A.

An emulsion a was prepared by the preliminary addition of 49.1 parts water and 0.9 parts nonionic surfactant a to 50 parts diorganopolysiloxane a followed by emulsification using a colloid mill emulsifier. 10 parts emulsion a was added to slurry A while stirring. Holding for 10 minutes gave slurry A-1. Slurry A 1 was immediately passed through a filter cloth-equipped filter for drainage. Pressure dewatering/molding then gave the filtrate and a molding. The molding was dried at 180° C. for 15 hours.

Another slurry (slurry A-2) was prepared as above, but in this case heating slurry A to 70° C. and then adding the same quantity of emulsion a.

For the purposes of comparison, another slurry (slurry A-3) was prepared as above, but in this case by cooling slurry A to 20° C. prior to adding emulsion a.

Moldings and filtrates were prepared as above from these slurries. The properties of the various moldings were and these results are reported in Table 1.

As demonstrated in Table 1, the moldings in accordance with the present invention had an excellent water repellency, a low water absorption, and an extremely small diorganopolysiloxane release into the filtrate. In contrast, in the comparison example (addition of emulsion a at 20° C., below the cloud point), absorption of the diorganopolysiloxane was poor and the water repellency was also poor. In addition, the water absorption was fairly high and a large quantity of diorganopolysiloxane was released into the filtrate.

TABLE 1

| Temperature of Emulsion a Addition | Cloud Point of Emulsifying Agent | Water-Repellancy of molding | Water Absorption % | Content of Organopolysiloxane in the Filtrate (waste water) ppm |
|---|---|---|---|---|
| PRESENT INVENTION | | | | |
| 50° C. (slurry A-1) | 40° C. | + + + | 11.0 | 8.8 |
| 70° C. (slurry A-2) | 40° C. | + + + | 9.5 | 10.5 |
| COMPARISON EXAMPLES | | | | |
| 20° C. (slurry A-3) | 40° C. | + + | 45.0 | 650.0 |
| no addition | — | x x | 910.0 | |

EXAMPLE 2

Emulsions with the compositions reported in Table 2 were prepared as described in Example 1 using diorganopolysiloxane b in place of the diorganopolysiloxane a used in Example 1 and using nonionic surfactants a thru c.

Two emulsions with the compositions reported in Table 2 were also prepared for the purposes of comparison. These were prepared like the other emulsions, but using anionic surfactant d or the 1:1 mixture of anionic surfactant d and nonionic surfactant a.

Water-repellent hardened moldings and filtrates were prepared as described in Example 1 using these emulsions. The temperature of slurry A was 80° C. during the addition of the emulsion. The water repellency of the moldings and the diorganopolysiloxane content in the filtrate were measured as in Example 1, and these results are also reported in Table 2. The water-repellent hardened molding had a specific gravity of 0.30.

As demonstrated in Table 2, the moldings prepared in accordance with the present invention had good water repellencies, very low values for diorganopolysiloxane release into the filtrate, and a correspondingly very good diorganopolysiloxane absorption. In the case of the anionic surfactant by itself, diorganopolysiloxane absorption was poor, and a large amount was released into the filtrate. The performance of the 1:1 mixture of nonionic surfactant a and anionic surfactant was as poor as that of the anionic surfactant by itself.

ane a, b, or c, and the respective emulsions a-a, b-a, and c-a were prepared as in Example 1 using a colloid mill. For each of emulsions a-a, b-a, and c-a, 4 parts of the emulsion was added to a slurry B that was being held at 80° C. This was followed by stirring for 5 minutes, thereby affording 3 different slurries. In each case, the slurry was poured onto a 100×100×140 mm filter and filtered on a 50 mesh wire net under suction.

A panel of the solid fraction afforded by filtration was placed between dried filter papers and gradually compressed while the water was absorbed. The final pressure was 60 kg/cm². After drying for approximately 15 hours at room temperature, curing was then carried out for 3 days at 35° C./RH 90%. Drying for 20 hours at 130° C. then gave a cement exterior wall panel with a size of 100×100×10 mm, a weight of 100 g, and a specific gravity of 1.0. The water absorption of this panel was measured as in Example 1, and the amount of diorganopolysiloxane released into the filtrate was also measured as in Example 1.

For comparison, panel and filtrates were prepared as described above, but in this case adding the diorganopolysiloxane emulsions to slurry B at 10° C. Also for the purposes of comparison, a panel was prepared as described above by the direct addition of 2.0 parts unemulsified diorganopolysiloxane c to slurry B. The various measurement results are reported in Table 3.

As demonstrated by the results reported in Table 3, the pulp-reinforced cement exterior wall panels prepared in accordance with the present invention were of TABLE 1-continued

| Temperature of Emulsion a Addition | Cloud Point of Emulsifying Agent | Water-Repellancy of molding | Water Absorption % | Content of Organopolysiloxane in the Filtrate (waste water) ppm |
| --- | --- | --- | --- | --- |
| (slurry A) | | | | |

TABLE 2

| Organopoly-siloxane | Emulsifying Agent | Temperature of Organopolysiloxane °C. | Cloud Point of the Emulsifying Agent °C. | Water Repellancy of the Molding | Content of Organopolysiloxane in the Filtrate (waste water) ppm |
| --- | --- | --- | --- | --- | --- |
| PRESENT INVENTION | | | | | |
| b | a | 80 | 40 | +++ | 7.5 |
| b | b | 80 | 60 | +++ | 9.0 |
| b | c | 80 | 58 | +++ | 10.0 |
| COMPARISON EXAMPLES | | | | | |
| b | d | 80 | none | ++/+ | 810.0 |
| b | mixture of a and d | 80 | none | ++/+ | 780.0 |
| no addition | — | — | — | xx | — |

EXAMPLE 3

14 parts perlite with a specific gravity of 0.14 (siliceous material) was added to 86.0 parts portland cement, and this was dispersed to homogeneity in 500 parts hot water (80° C.). To this was added 7 parts pulp (preliminarily) defibered in 500 parts hot water (80° C.) using a household juicer mixer), and a slurry B was prepared by mixing to homogeneity.

Separately, 48.5 parts water and 1.5 parts surfactant a were added in each case to 50 parts diorganopolysiloxhigh quality, with low water absorptions and a low diorganopolysiloxane discharge into the filtrate. In contrast, when the diorganopolysiloxane emulsion was added at the low temperature of 10° C., diorganopolysiloxane absorption was weak, the panel's water absorption was large, and discharge into the filtrate was quite large. In the case of the panel prepared by the direct addition of diorganopolysiloxane c, the water repellency was uneven (uneven wetting), which served to confirm that the diorganopolysiloxane had not been completely uniformly dispersed.

TABLE 3

| Organopoly-siloxane | Emulsifying Agent | Temperature of Organopolysiloxane Addition °C. | Cloud Point of the Emulsifying Agent °C. | Water Absorption % | Content of Organopolysiloxane in the Filtrate (waste water) ppm |
| --- | --- | --- | --- | --- | --- |
| PRESENT INVENTION ||||||
| a | a | 80 | 40 | 7.8 | 11.3 |
| b | a | 80 | 40 | 9.3 | 12.2 |
| c | a | 80 | 40 | 9.1 | 10.2 |
| COMPARISON EXAMPLES ||||||
| a | a | 10 | 40 | 22.3 | 910.0 |
| b | a | 10 | 40 | 24.0 | 880.0 |
| c | a | 10 | 40 | 23.6 | 850.0 |
| c | none | 10 | — | 31.2 | 7.5 |
| no addition | — | — | — | 43.8 | — |

EXAMPLE 4

A panel was prepared as in Example 3, but in this case using a diorganopolysiloxane mixture (1:1 weight ratio) of dimethylpolysiloxane (viscosity=50 cst) with the formula $$(CH_3)_3SiO[(CH_3)_2SiO]_{40}Si(CH_3)_3$$

and diorganopolysiloxane a from Example 1. Property evaluation was carried out as in Example 3, and these measurement results are reported in Table 4. These results confirmed that the preparative method of the present invention affords moldings with a low water absorption while at the same time releasing only very small quantities of the diorganopolysiloxane into the filtrate.

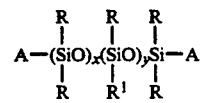

and a nonionic surfactant that has a cloud point; wherein the addition to the slurry is carried out with mixing and at a temperature at or above the cloud point of the nonionic surfactant; and wherein R is a monovalent hydrocarbon group; $R^1$ is an alkyl group having 4 to 12 carbon atoms; x is a number having a value of zero to 1,000; y is a number having a value of zero to 500; x+y has a value of 2 to 1,000; and A is selected from the group consisting of R and $R^1$; with the provision that, when y=zero, A is selected from the group con-

TABLE 4

| Organopoly-siloxane | Emulsifying agent | Temperature of Organopolysiloxane Addition °C. | Cloud Point of the Emulsifying Agent °C. | Water Absorption % | Content of Organopolysiloxane in the Filtrate (waste water) ppm |
| --- | --- | --- | --- | --- | --- |
| PRESENT INVENTION ||||||
| 1:1 a and dimethyl oil with viscosity = 50 cst. | a | 80 | 40 | 7.2 | 9.5 |
| COMPARISON EXAMPLES ||||||
| same | a | 10 | 40 | 23.0 | 920 |

The method of the present invention is a very efficient method for the preparation of highly water-repellent hardened moldings that exhibit little unevenness in water repellency. Moreover, the method of the present invention accomplishes this without releasing diorganopolysiloxane into the effluent from the fabrication process.

What is claimed is:

1. A method for preparation of water-repellent hardened moldings, wherein the method comprises (I) preparing a slurry of a mixture comprised of a calcareous material that has CaO unit as a main component and siliceous material that has $SiO_2$ unit as a main component, in an arbitrary quantity of water;

(II) adding to the slurry an emulsion comprising 0.05 to 10 weight parts per 100 parts of the calcareous and siliceous material of a diorganopolysiloxane represented by

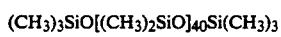

sisting of R, $OR^2$, $R^1$, and a hydroxyl group, where $R^2$ is an alkyl group having 1 to 3 carbons; and (III) subsequently draining off the water, forming a molding, and drying the molding to provide a water-repellent hardened molding.

2. A method as claimed in claim 1 wherein the calcareous material is calcium oxide powder.

3. A method as claimed in claim 1 wherein the calcareous material is portland cement.

4. A method as claimed in claim 1 wherein the siliceous material is crushed silica.

5. A method as claimed in claim 1 wherein the siliceous material is perlite.

6. A method as claimed in claim 1 wherein the diorganopolysiloxane is a trimethylsiloxy-endblocked dimethylsiloxane-methyloctylsiloxane copolymer represented by

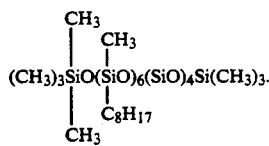

7. A method as claimed in claim 1 wherein the diorganopolysiloxane is a dimethylsilanol-endblocked dimethylpolysiloxane represented by

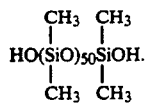

8. A method as claimed in claim 1 wherein the diorganopolysiloxane is a trimethylsiloxy-endblocked dimethylpolysiloxane represented by

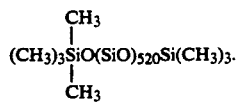

9. A method as claimed in claim 1 wherein the nonionic surfactant is selected from the group consisting of ethylene oxide adducts of higher alcohols, ethylene oxide adducts of alkylphenols, ethylene oxide adducts of fatty acids, ethylene oxide adducts of fatty acid esters with polyhydric alcohols ethylene oxide adducts of oils and fats, and ethylene oxide adducts of higher alkylamines.

10. A method as claimed in claim 1 wherein the nonionic surfactant is an ethylene oxide adduct of a higher alcohol.

11. A method as claimed in claim 1 wherein the nonionic surfactant is polyoxyethylene (6.5 moles) lauryl ether having a cloud point of 40° C.

12. A method as claimed in claim 1 wherein the nonionic surfactant is polyoxyethylene (8.0 moles) lauryl ether having a cloud point of 60° C.

13. A method as claimed in claim 1 wherein the nonionic surfactant is polyoxyethylene (9.5 moles) nonylphenyl ether having a cloud point of 58° C.

* * * * *